F. W. BRAMPTON.
WHEEL FOR MOTOR AND OTHER VEHICLES.
APPLICATION FILED OCT. 12, 1911.

Patented Aug. 19, 1913

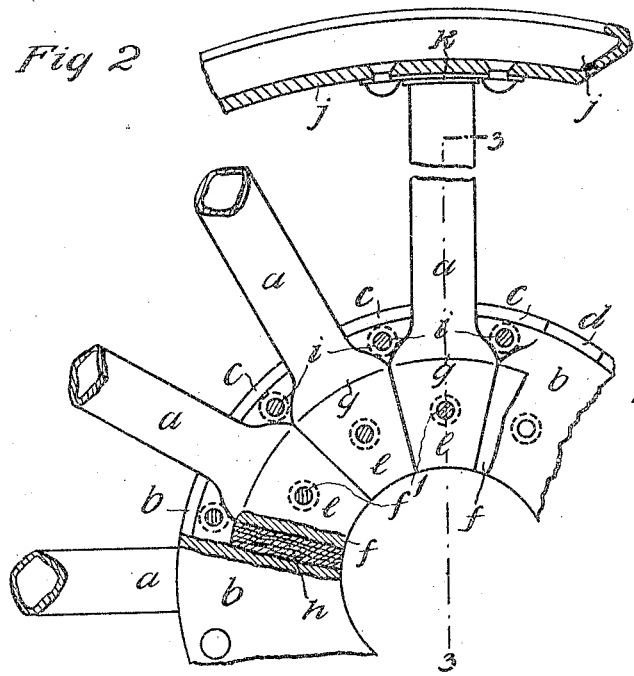
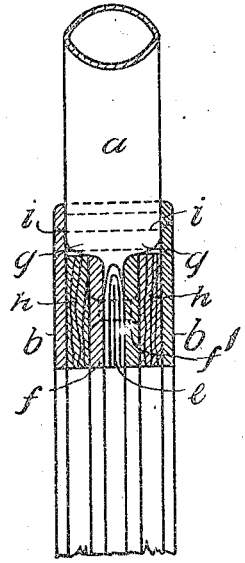
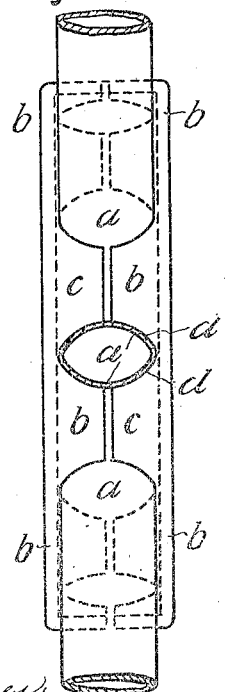
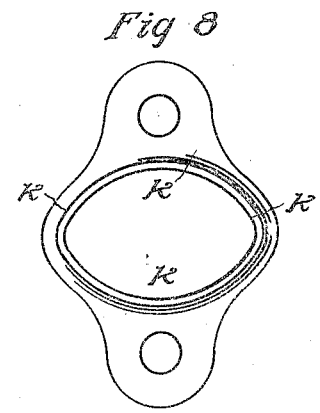
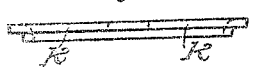
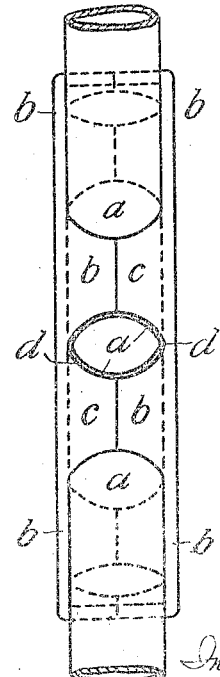

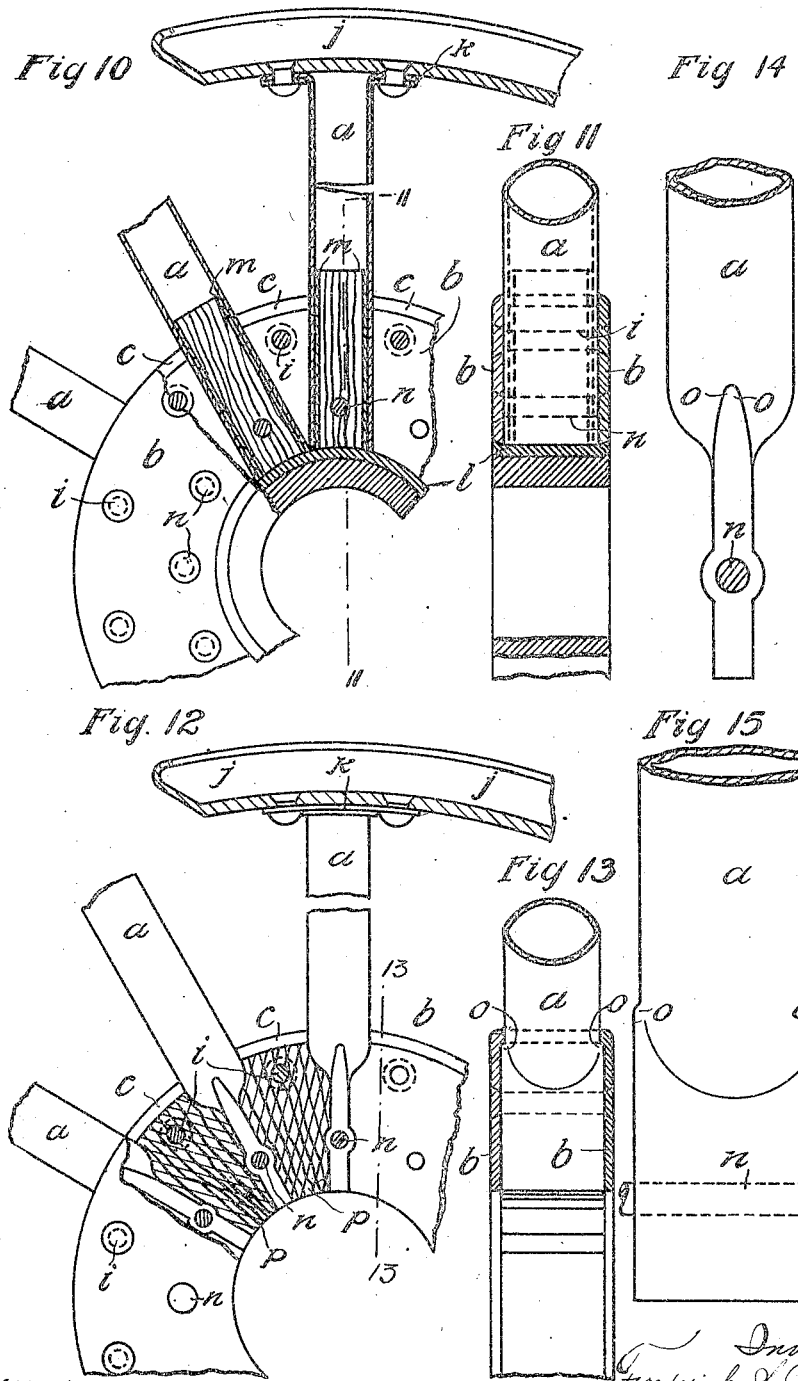

UNITED STATES PATENT OFFICE.

FREDERICK WILLIAM BRAMPTON, OF KIDDERMINSTER, ENGLAND.

WHEEL FOR MOTOR AND OTHER VEHICLES.

1,070,396.  Specification of Letters Patent.  Patented Aug. 19, 1913.

Application filed October 12, 1911. Serial No. 654,404.

*To all whom it may concern:*

Be it known that I, FREDERICK WILLIAM BRAMPTON, a subject of the King of Great Britain, residing at Kidderminster, England, have invented new and useful Improvements in Wheels for Motor and other Vehicles, of which the following is a specification.

This invention comprises improvements in and relating to wheels for motor and other vehicles and has for its object to provide an effective tubular spoke wheel.

Wheels built up with tubular spokes secured by metal centers and with steel rims have advantages in lightness and strength which render them desirable if they can be produced in a manner insuring the absolute rigidity and security of the bracing of the spokes at the wheel center.

My invention enables a rigid and secure bracing to be effected and provides a light strong wheel.

In accordance with the invention I employ two cupped shells for the wheel center in each of which the flange is formed or provided with a series of notches or gaps to embrace the spokes. The spokes form a fit in the notches or gaps of the flanges when the shells are separated to some extent and the shells are then closed together under considerable pressure, thus the jaws formed by the gapped flanges bite into the spokes and the shells are riveted or otherwise secured in this position.

I prefer to shape the ends of the spokes so that they form a solid ring of metal at the wheel center so that the complete wheel has great advantages in strength under load or shock.

Figure 1:
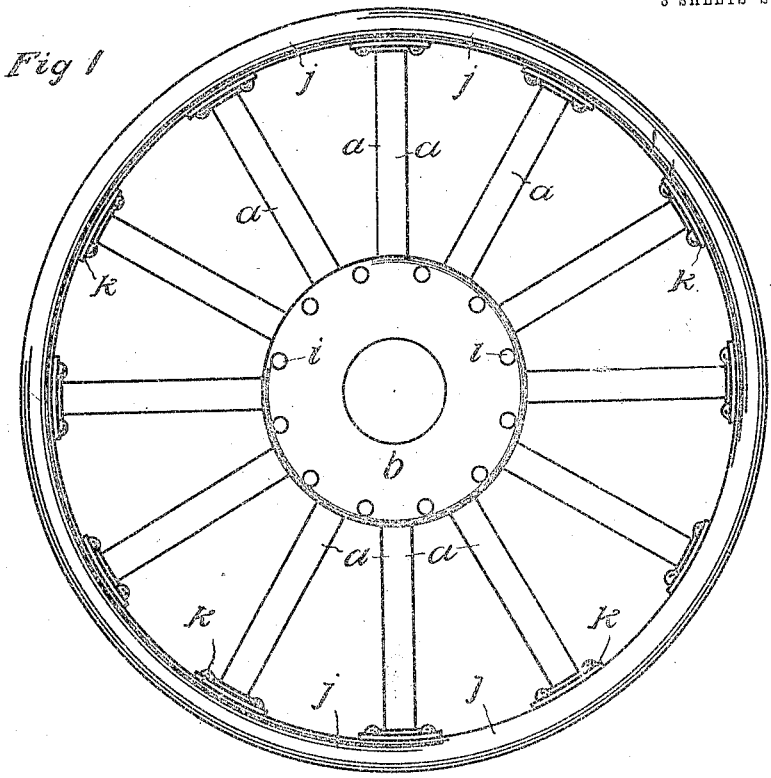
Figure 6:
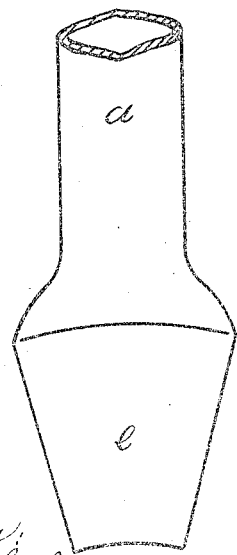
Figure 7:
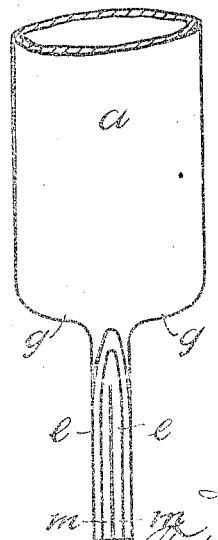

On the appended drawings: Figure 1. is an elevation of a complete wheel ready for mounting on a hub. Fig. 2. is a part sectional elevation to a much larger scale showing a portion of the wheel. Fig. 3. is a section on line 3—3 of Fig. 2. Fig. 4. is a plan showing the spokes and plates in position and the flanged shells fitted close upon the spokes ready for compressing. Fig. 5. is a similar view to Fig. 4. showing the shells compressed upon the spokes. Fig. 6. is an elevation of one of the spokes removed. Fig. 7. is an elevation at right angles to Fig. 6. Fig. 8. shows in plan an attachment plate that may be used for connecting the spokes to the rim. Fig. 9. shows an edge view of the attachment plate. Fig. 10 is a part sectional elevation of a part of a wheel showing a modification of method of building up the wheel center but the feature of the gripping flanged shells is employed as before. Fig. 11 is a section at line 11—11 of Fig. 10. Fig. 12. is a similar view to Fig. 10 showing a further modification. Fig. 13. is a section on line 13—13 of Fig. 12. Fig. 14 is an elevation of a spoke removed. Fig. 15. is an elevation at right angles to Fig. 14.

The tubular spokes $a$ are shown of oval form with the greatest diameter disposed laterally of the wheel to give the necessary lateral strength. I prefer such oval section spokes for the wheels of motor vehicles where lateral strains are very great but I do not limit my invention to spokes of this kind. The wheel center is formed of two cupped or flanged shells $b$, the flanges $c$ of which are approximately at right angles to the side or plate of the shell. Each flange is gapped or notched as at $d$ and each of the gaps or notches follows the contour of a spoke but is preferably rather less than half the cross sectional area of same at the part where it will embrace it. The shells are formed with a central opening as shown. I prefer to press the end of the spokes in the direction of their greatest width to flatten them and I shape off the flattened parts $e$ into a wedge shape, see Fig. 6. The wedge parts $e$ are cut to a size which will enable their nesting tightly together around the wheel center and the inclination of each edge is such that it is radial to the wheel center and exactly meets the edge of the adjacent spoke as clearly shown at Fig. 2, thus forming a solid ring of metal. Against the ring of metal formed by the wedge parts $e$ of the spokes I prefer to place on each side a metal ring $f$ whose outer edge abuts against the shoulder $g$ formed by the flattening of the spoke. Against the outer face of each of the rings $f$ the rings $f$ are riveted to the spokes by the rivets $f'$. I arrange a pad $h$ of wood or other suitable material and the shells $b$ come against these pads and inclose the whole. Owing to the gaps or notches $d$ of the flanges of the shells $b$ being less than half the cross sectional area of the spokes whose contour they fit there is a gap between the edges of the flanges when the shells are fitting tight against the spokes $a$ and the wood pads $h$ as shown at Fig. 4. The wheel is then placed in a press and the shells are forced up together thus compressing the pads $h$ and biting by means of the flanges $c$ into the spokes $a$. In this condition the parts are riveted or otherwise secured together but countersunk headed rivets $i$ are preferably used. The ends of the spokes may be connected to any suitable rim $j$ in any desired manner, that shown on the drawing at Figs. 2, 8, and 9 is an example only. In this example a plate $k$ with a central hole which has a sunk margin is fitted onto the end of the spoke and is brazed or welded thereon and the plate is riveted or otherwise secured to the rim $j$. I prefer to carry the spoke end through flush with the back of the plate $k$ so that there is a direct abutment of the spoke end against the rim. With a wheel built up in this way absolute rigidity of the center and the spokes is obtained for as will be understood the biting of the flanges $c$ into the spokes is a security that is not affected by the wearing of rivets or other slackness that may occur in built up wheels after long use. In addition to such security as is given by the biting in of the flanges $c$ it will be observed from Fig. 2, that the wedging of the ends of the spokes so that they form a complete ring of metal forms a second secure fixture of the spokes against any movement around the wheel center. The rivets also are a security against such movement. Laterally there is the grip of the flanges on the spokes and the firm mounting caused by the compression on the pads $h$ and the support given by the rings $f$. Compression strains on the wheel are taken by the grip of the flanges on the spokes, the abutment of the shoulders $g$ on the rings $f$ and the direct bearing of the ends of the spokes on the hub or on a sleeve around same for as will be seen from Fig. 2, the spoke ends are flush with the central margins of the rings $f$ the pads $g$ and the shells $b$ so that the rivets $i$ are largely relieved of strain. Tensional strains are taken by the shoulders formed by the tops of the wedge parts of the spokes bearing against the undersides of the flanges $c$ of the shells, and by the flanges gripping into the spokes as before described.

In the modification shown at Fig. 10 the ends of the spokes $a$ within the shells $b$ are not flattened but are of oval form throughout and meet one against the side of the other upon an eyelet or short sleeve $l$ which passes through the shells $b$ and is expanded into countersunk margins of the shells as at Fig. 11. The spokes are preferably fitted with a liner $m$, see Fig. 10, and may have a hard wood filling also. A rivet $n$ may pass through each spoke and the shells may be secured together by rivets $i$ as in the previous example but in this example the rivets are spaced between the spokes. If desired the space between the spokes may be filled with hard wood blocks or any other suitable filling. It will be understood that in this example the compression of the side shells $b$ onto the spokes is followed in the same way as the previous example.

In the further modification shown at Figs. 12 to 15 the flanged shells $b$ are used and gripped on the spokes exactly as before. The spokes are flattened at their inner ends but at right angles to the direction of flattening shown at Figs. 1 to 7, that is to say in the present case the flattening is in the plane of the greatest width of the oval and this flattening is arranged transversely between the shells as shown. The spokes are preferably drilled before flattening and a rivet $n$ is inserted in the hole and the spoke is then flattened in dies which press the metal of the sides of the oval together except at the rivet where it is pressed around it as shown at Figs. 14 and 15. The spoke is held in the dies so that the sides of the flattened part are not free to expand past the side margins of the oval or they may be allowed to expand just past such margins as here shown. This then forms shoulders $o$ which bear against the flanges $c$ of the shells $b$ to relieve the rivets of tensional strains. The rivets $n$ are riveted over flush with the faces of the shells $b$ when the latter are pressed into the spokes. When a shoulder $o$ is formed on the spokes the gaps $d$ in the flanges $c$ must not be cut right to the inner faces of the shells but a distance short thereof corresponding to the shoulder. The spaces between the spoke ends are filled with hard wood or other filling $p$ and the rivets $i$ are passed through the shells as before.

In all the examples I may provide the inner ends of the spokes with the liners $m$ for strengthening them or I may use a heavier gage of metal for the whole spoke.

The metal used for the wheel is preferably steel so that the spokes and shells may be light while giving great strength.

What I claim and desire to secure by Letters Patent then is:

1. A wheel having in combination a rim, tubular spokes extending from said rim to a wheel center, said spokes being flattened to a wedge at their inner ends, which wedge parts fit each other to form a ring at the wheel center, a pair of rings, said rings bracing said wedge parts of said spokes, and a pair of flanged shells, said shells inclosing said rings and biting by means of their flanges into the spokes above said rings.

2. A wheel having in combination a rim, tubular spokes extending from said rim to a wheel center, said spokes being flattened to a wedge at their inner ends, which wedge parts fit each other to form a ring at the wheel center, a pair of rings, said rings bracing said wedge parts of said spokes, a pair of pads, said pads being disposed against said rings and a pair of inclosing shells, said shells having flanges which are forced in to bite on the spokes above the pads and rings and the wedge parts of the spokes.

In testimony whereof I affix my signature in presence of two witnesses.

FREDERICK WILLIAM BRAMPTON.

Witnesses:
F. GILBERT BRETTELL,
E. S. BRETTELL.